US007820961B2

(12) United States Patent
Hashimoto et al.

(10) Patent No.: US 7,820,961 B2
(45) Date of Patent: Oct. 26, 2010

(54) MASS SPECTROMETER AND METHOD OF MASS SPECTROMETRY

(75) Inventors: Yuichiro Hashimoto, Tachikawa (JP); Hideki Hasegawa, Tachikawa (JP); Izumi Waki, Tokyo (JP); Masuyuki Sugiyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 479 days.

(21) Appl. No.: 11/745,516

(22) Filed: May 8, 2007

(65) Prior Publication Data

US 2008/0116372 A1 May 22, 2008

(30) Foreign Application Priority Data

Nov. 22, 2006 (JP) ............................. 2006-314986

(51) Int. Cl.
*B01D 59/44* (2006.01)
*H01J 49/00* (2006.01)

(52) U.S. Cl. ....................... 250/281; 250/282; 250/290; 250/293; 250/292

(58) Field of Classification Search ................. 250/281, 250/282, 290–298, 286, 287
See application file for complete search history.

(56) References Cited

U.S. PATENT DOCUMENTS 5,179,278 A * 1/1993 Douglas ..................... 250/290
5,420,425 A 5/1995 Bier et al.
5,679,950 A * 10/1997 Baba et al. .................. 250/281
5,783,824 A 7/1998 Baba et al.
5,847,386 A 12/1998 Thomson et al.
6,111,250 A * 8/2000 Thomson et al. ............ 250/282
6,177,668 B1 1/2001 Hager
6,403,955 B1 * 6/2002 Senko ........................ 250/292
6,545,268 B1 * 4/2003 Verentchikov et al. ...... 250/287
6,852,972 B2 2/2005 Baba et al.
7,019,289 B2 * 3/2006 Wang ......................... 250/290
7,067,802 B1 * 6/2006 Kovtoun ..................... 250/282
7,329,866 B2 * 2/2008 Wang ......................... 250/290
2005/0067564 A1 * 3/2005 Douglas et al. ............. 250/290

(Continued)

FOREIGN PATENT DOCUMENTS

WO WO 2006/008537 1/2006

OTHER PUBLICATIONS

Hashimoto et al "Mass Selective Ejection By Axial Resonant Excitation From A Linear Ion Trap" Journal of the American Society for Mass Spectrometry, Elsevier Science Inc. US vol. 17, No. 5 May 1, 2006.

(Continued)

*Primary Examiner*—Jack I Berman
*Assistant Examiner*—Brooke Purinton
(74) *Attorney, Agent, or Firm*—Antonelli, Terry, Stout & Kraus, LLP.

(57) ABSTRACT

A linear trap having high ejection efficiency and low ejection energy is realized. In a mass spectrometer in which ions generated by an ion source are introduced to a quadrupole rod structure applied with RF voltage and ejected from the quadrupole rod structure so as to be detected by a detection mechanism, a mass dependent potential is formed in the axial direction of the quadrupole rod structure and ions are ejected mass selectively from the vicinity of a minimum point of the potential, the mass dependent potential being formed by applying electrostatic voltage and RF voltage to an insertion electrode inserted in the quadrupole rods.

17 Claims, 6 Drawing Sheets

U.S. PATENT DOCUMENTS

2005/0127290 A1 6/2005 Hashimoto et al.
2005/0253064 A1* 11/2005 Loboda et al. .............. 250/292
2005/0269504 A1* 12/2005 Hashimoto et al. .......... 250/286
2006/0169892 A1 8/2006 Baba et al.
2007/0158545 A1* 7/2007 Verentchikov .............. 250/282
2007/0164213 A1* 7/2007 Javahery et al. ............. 250/292
2008/0191130 A1* 8/2008 Bateman et al. ............. 250/283
2009/0014637 A1* 1/2009 Giles et al. .................. 250/281
2009/0057546 A1* 3/2009 Giles .......................... 250/282
2009/0114810 A1* 5/2009 Green ........................ 250/282
2009/0302209 A1* 12/2009 Green et al. ................ 250/282

OTHER PUBLICATIONS

Loboda et al, "Novel Linac II Electrode Geometry For Creating An Axial Field In A Multipole Ion Guide", European Journal of Mass Spectrometry, IM Publications, US, vol. 6, Jan. 1, 2000.

* cited by examiner

RF AMPLITUDE 20V

RF AMPLITUDE 50V

RF AMPLITUDE 35V

RF AMPLITUDE 60V

MASS SPECTROMETER AND METHOD OF MASS SPECTROMETRY

INCORPORATION BY REFERENCE

The present application claims priority from Japanese application JP2006-314986 filed on Nov. 22, 2006, the content of which is hereby incorporated by reference into this application.

BACKGROUND OF THE INVENTION

The present invention relates to a mass spectrometer and a method of operating the same.

A linear trap can perform $MS^n$ analysis and has been used widely for proteome analysis, for instance. How the mass dependent ion ejection of ions trapped by the linear trap has been carried out in the past will be described hereunder.

An example of mass dependent ion ejection in a linear trap is described in U.S. Pat. No. 5,420,425. After ions axially inputted have been accumulated in the linear trap, ion selection or ion dissociation is conducted as necessary. Thereafter, a supplemental AC electric field is applied across a pair of opposing quadrupole rods to resonantly excite ions of a particular mass to a radial direction. By scanning a trapping RE voltage, ions can be ejected mass dependently in the radial direction. Since a pseudo harmonic potential formed by a radial quadrupole electric field is used for mass separation, the mass resolution can be high.

Another example of mass dependent ion ejection in a linear trap is described in U.S. Pat. No. 6,177,668. After ions axially inputted have been accumulated in the linear trap, ion selection or dissociation is conducted as necessary. Thereafter, a supplemental AC voltage is applied across a pair of opposing quadrupole rods to excite ions radially. The ions subject to radial resonant excitation are axially ejected by a fringing field developing between the quadrupole rods and an end electrode. The frequency of the supplemental AC voltage or the amplitude value of a trapping RF voltage is scanned. Since a pseudo harmonic potential formed by a radial quadrupole electric field is used for mass separation, the mass resolution can be high.

Still another example of mass dependent ion ejection in a linear trap is described in U.S. Pat. No. 5,783,824. Axially inputted ions are accumulated. A vane lens is inserted between adjacent rod electrodes of a quadrupole rods and a harmonic potential is formed along the linear trap axis by a DC bias applied to the vane lens in respect of the quadrupole rod. Thereafter, by applying a supplemental AC voltage between vane lenses, ions can be excited resonantly and ejected mass dependently in the axial direction. The DC bias or the frequency of the supplemental AC voltage is scanned.

A system for ejecting ions at low energy from a three-dimensional ion trap is described in U.S. Pat. No. 6,852,972. In the method, when ejecting ions from the three-dimensional ion trap, a DC voltage is applied between end caps, and an RF voltage is scanned, so that ions of a higher mass are initially ejected, followed by sequential ejection of ions of lower mass. Since ions can be ejected from the vicinity of an energy minimum point, the spread of ejection energy at room temperature level can be achieved.

Further, U.S. Pat. No. 5,847,386 describes a method of controlling ion motion by inserting electrodes between adjacent rod electrodes of a quadrupole rods to form an axial electric field. Potential difference between the quadrupole rods and the inserted electrodes is utilized to reduce time for ion ejection and to perform trapping.

SUMMARY OF THE INVENTION

An object of the present invention is to provide a linear trap which can perform mass selective ejection while restraining the spread of ejection energy to the room temperature level (level of several 10 meV). In comparison with the conventional three-dimensional ion trap, the linear trap has advantageous characteristics including higher trapping efficiency and larger charge capacity and can be used in combination with another mass spectrometer. On the other hand, in a time-of-flight mass spectrometer, an orbitrap mass spectrometer and a quadrupole mass spectrometer, the permissible range of energy spread for incident ions is very narrow. Accordingly, when ion inputting is conducted with the energy spread in excess of the permissible range, there results a reduction in ion transmission or a reduction in mass resolution. Then, with the spread of ejection energy restrained to the room temperature level, the linear trap can be combined highly efficiently with such a mass spectrometer of a narrow energy permissible range of incident ions as the time-of-flight mass spectrometer, the orbitrap mass spectrometer or the quadrupole mass spectrometer.

In the case of U.S. Pat. No. 5,420,425, ions are ejected radially. Since a voltage of kV order is applied to the quadrupole rods during ejection, the ejection energy spread is several 100 eV or more.

In the case of U.S. Pat. Nos. 6,177,668 and 5,783,824, too, the resonant excitation is used for ejection of ions. In these methods, energy is applied to ejection ions to cause them to exceed a potential barrier and consequently, energy is necessarily applied to the ejection ions and the spread of energy appreciably goes beyond the room temperature.

U.S. Pat. No. 6,852,972 gives a description of the three-dimensional ion trap but neither describes nor suggests the mass dependent ion ejection from the linear trap.

U.S. Pat. No. 5,847,386 gives a description of ion control based on DC potential which does not depend on mass and does not at all describe and suggest the mass dependent ion ejection.

An object of the present invention is to provide a linear trap which can perform mass dependent ejection while restraining the spread of ejection energy to the room temperature level (level of several 10 meV).

A mass spectrometry and mass spectrometer according to the present invention comprises a section for introducing ions generated by an ion source, quadrupole rods applied with RF voltage and a detection mechanism for detecting ejected ions, wherein (1) means is provided for forming a mass dependent potential in the rod axis direction to permit ions to be ejected mass dependently in the axial direction from the vicinity of a minimum point of the potential; and (2) in order for the potential formation means to form the mass dependent potential, a static electric voltage and an RF voltage are applied to an insertion electrode inserted between adjacent rod electrodes of the quadrupole rods.

According to the present invention, a linear trap capable of performing mass dependent ejection which restrains the ejection energy spread to the room temperature level (level of several 10 meV) can be realized.

Other objects, features and advantages of the invention will become apparent from the following description of the embodiments of the invention taken in conjunction with the accompanying drawings.

EXPLANATION OF THE INVENTION

Embodiment 1

Figure 1A:
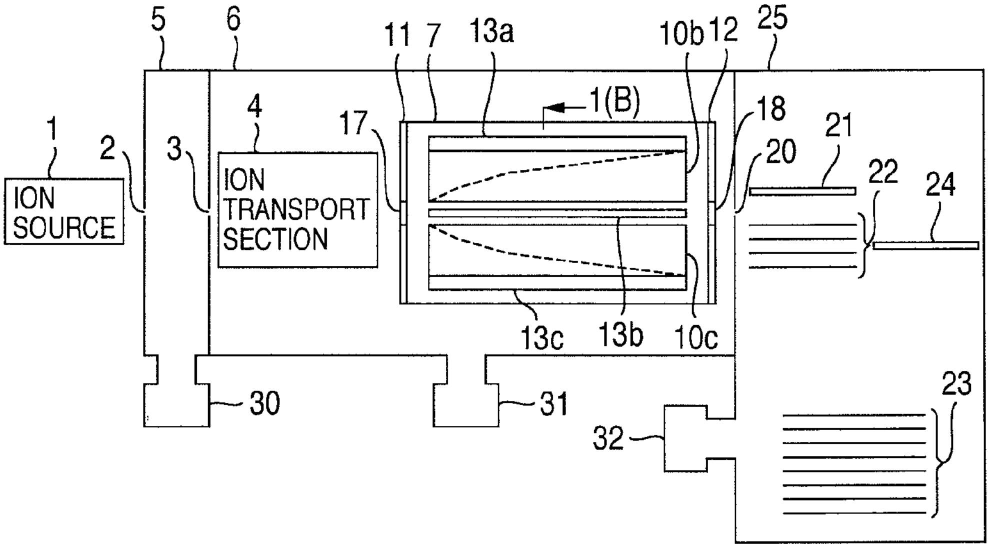
FIGS. 1A and 1B are diagrams showing embodiment 1 of a system according to the present invention.
Figure 1B:
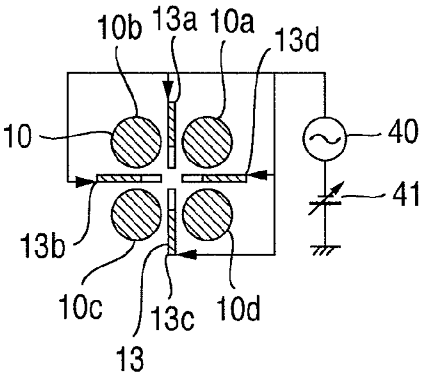

Referring first to FIGS. 1A and 1B, a mass spectrometer practicing linear trapping according to the present invention is constructed as illustrated therein. FIG. 1A shows the overall apparatus and FIG. 1B shows a cross-sectional view showing a radial arrangement of the apparatus. Ions generated in an ion source 1, such as based on electrospray ionization, atmospheric pressure chemical ionization, atmospheric pressure photo-ionization, atmospheric pressure matrix-assisted laser desorption ionization or matrix-assisted laser desorption ionization, pass through an orifice 2 so as to be introduced to a differential evacuation chamber 5. The differential evacuation chamber is pumped by a pump 30. Ions from the differential pumping chamber pass through an orifice 3 so as to be introduced to an analyzer or spectrometry section 6. The spectrometry system is pumped by a pump 31 and maintained at a vacuum degree of $10^{-4}$ Torr or less ($1.3\times10^{-2}$ Pa or less). After going through an ion transport section 4 comprised of an ion lens, a quadrupole mass filer and an ion trap, ions pass through an orifice 17 so as to enter a linear trap section 7. A bath gas (not shown) is admitted to the linear trap section 7, which linear trap section is then maintained at $10^{-4}$ Torr to $10^{-2}$ Torr ($1.3\times10^{-2}$ Pa to 1.3 Pa). The admitted ions are trapped in a region defined by in cap 11, quadrupole rods 10, insertion electrode structure 13 having electrodes inserted among quadrupole rod electrodes and an end cap 12. The insertion electrode structure is applied with DC voltage 41 and RF voltage 40 (DC voltage and RF voltage simply referred to hereinafter will define these voltages). Among the ions trapped in this region, ions of a specified m/z cab be ejected axially by changing at least one of the amplitude or frequency of RF voltage 40 or the value of DC voltage. The insertion electrode may preferably be so shaped as to have its width which is radially wider on the ion outlet side than on the ion inlet side. As an example, a curved insertion electrode is illustrated herein. Although the curved insertion electrode is illustrated in the figure, other electrode shapes suitable for efficient radial extraction of ions can be optimized through simulation. After passing through an orifice 20, the ejected ions are introduced to a time-of-flight mass spectrometer 25. The ions admitted to the time-of-flight mass spectrometer 25 are accelerated at a specified period toward an orthogonal direction by means of a pusher electrode 21, accelerated by an extraction electrode 22, reflected by reflectron and then detected by a detector 24 constructed of, for example, a MCP (micro-channel plate). Since the m/z is known from a time elapsing between the push acceleration and the detection and the ion intensity can be known from the signal intensity, a mass spectrum can be obtained.

An offset potential of ± several 100 V is sometimes applied to the quadrupole rods 10 but in describing a voltage applied to the respective rod electrodes of the quadrupole rods 10 hereinafter, the applied voltage is defined as having a value when the offset potential to the quadrupole rods 10 is set to 0. A high-frequency voltage having an amplitude of approximate 100V to 5000V and a frequency of approximate 500 kHz to 2 MHz (trap RF voltage) is applied to the quadrupole rods 10. At that time, trap RF voltages in a same phase are applied to opposing rod electrodes (a set of 10*a* and 10*c* and a set of 10*b* and 10*d* in the figure: this definition stands in the following description) and on the other hand, trap RF voltages in opposite phase are applied to laterally or vertically adjoining rod electrodes (a set of 10*a* and 10*b*, a set of 10*b* and 10*c*, a set of 10*c* and 10*d* and a set of 10*d* and 10*a* in the figure: this definition stands in the following description). Under the application of the RF voltages to the quadrupole rods, a pseudo potential is generated in a direction orthogonal to the quadrupole rod axis direction (referred to as a radial direction hereinafter). As a result, a focusing potential toward the center of the axis is produced. This is effective to give a radial distribution of ions which is within 1 to 2 mm from the center axis.

Figure 2:
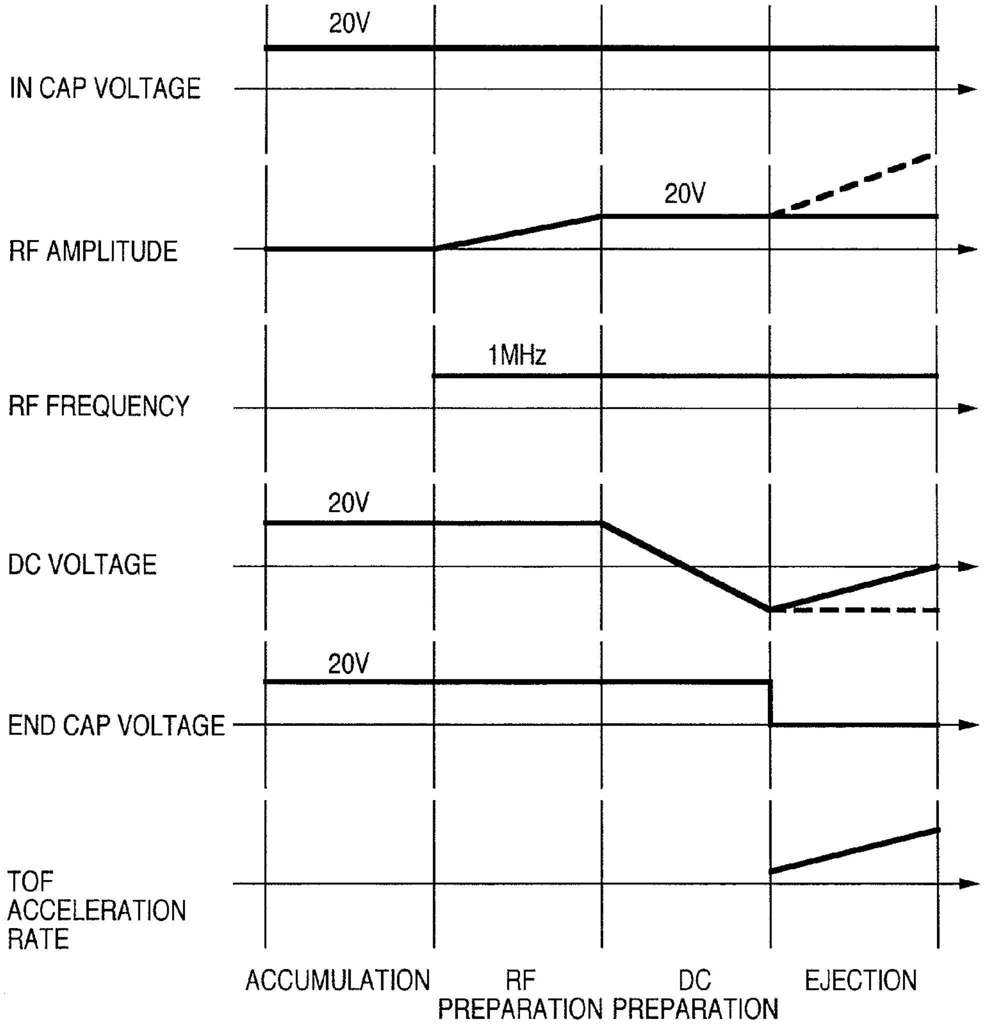
FIG. 2 is a time chart of measurement sequence in embodiment 1.

Typical application voltages for positive ion measurement will now be described. A measurement sequence is illustrated in a time chart of FIG. 2. The measurement is conducted through four sequence steps. During ion accumulation time, in cap voltage is set to 20 V and insertion electrode structure voltage is set to 20 V (only DC voltage). A pseudo potential is generated radially of a quadrupole field by the trap RF voltage and a DC potential is generated toward the outlet in the center axis direction of the quadrupole field, so that ions having passed through the orifice 17 are trapped near the end cap 12. Since, during this accumulation time, the axial potential DC field is applied and the potential minimum point exists near the outlet or end cap independently of the mass of ions, with the result that almost of all ions are trapped near the outlet. The trapping time amounting up to approximate 1 ms to 1000 ms largely affects the amount of ions introduced to the linear trap. If the trapping time is excessively long, the amount of ions increases, causing a phenomenon called space charge to occur inside the linear trap. When the space charge develops, there arises a problem that during mass scan to be described later, the position of spectral m/z shifts. Conversely, with the amount of ions being reduced excessively, a statistic error takes place and a mass spectrum of sufficient S/N cannot be obtained. For selection of a suitable trapping time, it is also effective that the amount of ions is monitored with any means and the length of trapping time is adjusted automatically.

Figure 4:
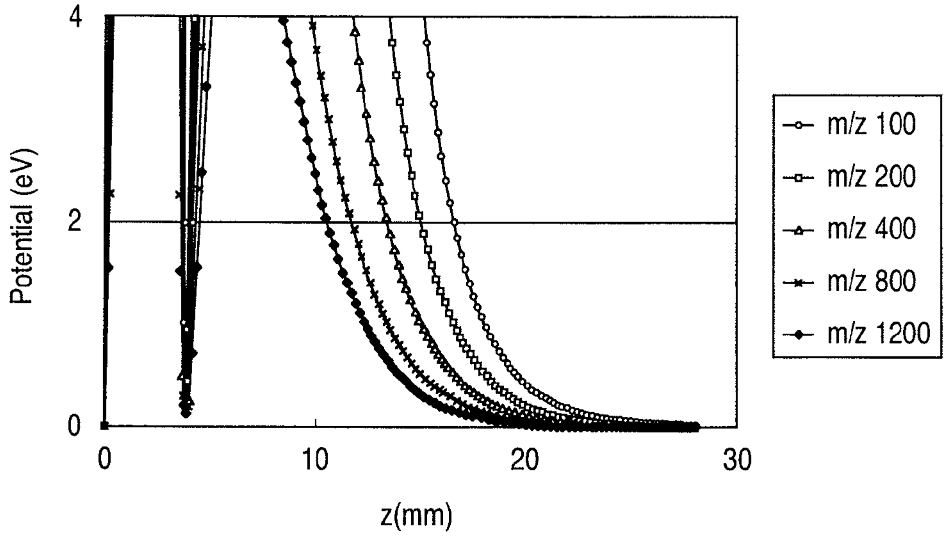
FIG. 4 is a graph useful to explain the effects of the present system.

Next, during the RF preparation time, the RF voltage amplitude to be applied to the insertion electrode is increased from 0 to approximate 10 to 100 V. The frequency of the RF voltage is set to approximate 300 kHz to 3 MHz. Through this, a pseudo potential due to the RF voltage is formed axially. In an exemplified insertion electrode structure, four plate-like insertion electrodes, each of which has distance d from the center axis expressed by $$d = 1.6 + 22.4\left(\frac{f}{L}\right)^3 \quad (1)$$

where f represents distance in the axial direction, amounting to 0 to 22 mm and L represents insertion electrode axial length equaling a 22 mm quadrupole rod electrode length, are used and calculation results are obtained as below. More specifically, in case the amplitude value is 20V and the frequency is 1 MHz, the RF voltage forms a pseudo potential as illustrated in FIG. 4. The pseudo potential Ψ is expressed by equation 2.

$$\Psi = \frac{e}{4m\Omega^2}E^2 \quad (2)$$

where e represents elementary electric charge, m ion mass, Ω frequency of each RF voltage and E electric field intensity amplitude formed by RF voltage. It will be seen from this equation that the pseudo potential formed by the same RF field is in inverse proportion to the mass. During the RF preparation time, the minimum point of the axial potential (a resultant potential of the pseudo potential in FIG. 4 and the DC potential) exists near the outlet independently of the mass of ion and consequently, all ions are trapped near the outlet.

Figure 5A:
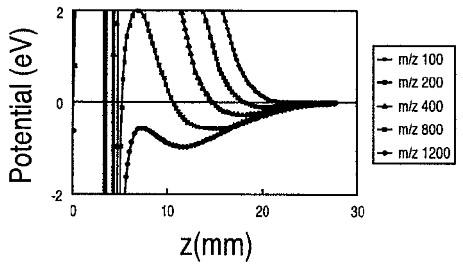
FIGS. 5A to 5D are graphs also useful to explain the effects of the present system.
Figure 5C:
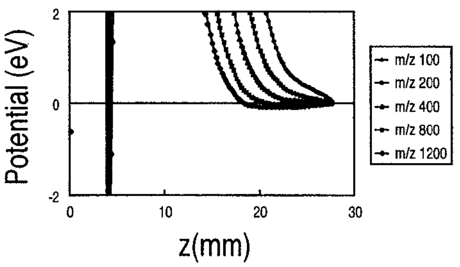
Figure 5B:
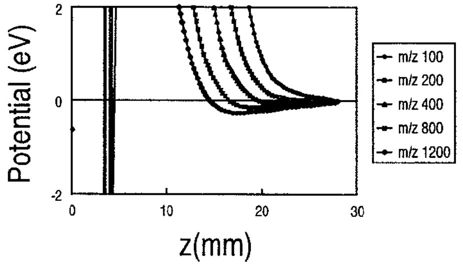
Figure 5D:
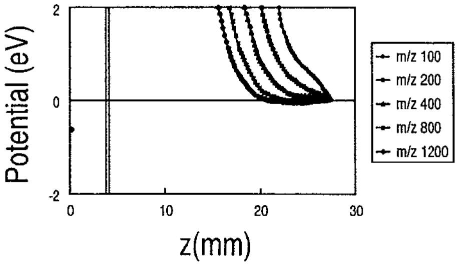

During the subsequent DC preparation time, the DC voltage applied to the insertion electrode structure is changed from approximate +20 V to −20 V. A resultant potential of the DC voltage and the RF voltage at that time is illustrated in FIG. 5A. Since during the DC preparation time the axial potential has different minimum points, ions are distributed to axially different positions depending on their masses and are trapped thereat.

In the last step of ejection time, the potential at the end cap is changed from approximate +20 V to 0 V. This allows only ions near the outlet to be ejected axially. As will be seen from FIG. 5A, ions of a low m/z (m/z 100) have a minimum point near the outlet and therefore, these ions are ejected.

Figure 3:
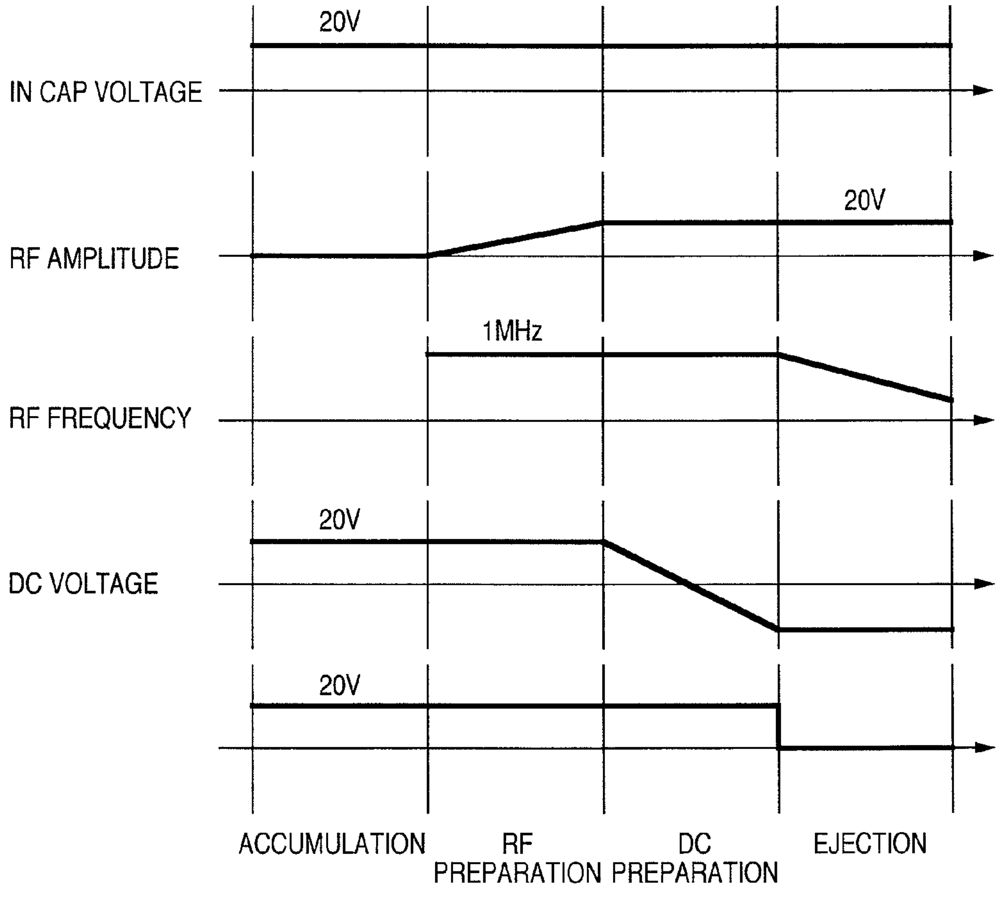
FIG. 3 is a time chart useful to explain the measurement sequence in embodiment 1.

By scanning the DC voltage applied to the insertion electrode structure from −20 V to 0 V (solid line in FIG. 2), scanning the RF amplitude applied to the insertion electrode structure from 20 V to a higher level (dotted line in FIG. 2) or changing the RF frequency from high to low (FIG. 3), the potential minimum point can sequentially be moved toward the outlet, starting with that for low mass ions to that for high mass ions.

Therefore, mass dependent ejection is carried out starting with ejection of ions of low m/z followed by ejection of ions of high m/z. As an example, when the RF amplitude applied to the insertion electrode is scanned from 20V to higher, results of calculation of potential can be obtained as shown in FIGS. 5A to 5D. With the RF amplitude raised to 35V, ions of m/z 200 are ejected. Then, it will be seen that as the RF amplitude further increases, ions ranging from low m/z to high m/z are sequentially ejected axially. The above description is given by way of measurement of positive ions but for measurement of negative ions, polarities of all DC voltages may be inverted.

Unlike the ejection based on resonant excitation, the invention bases itself on the sequential ejection of ions from the vicinity of minimum point of potential and so the energy distribution can be minimized. This feature facilitates the subsequent convergence by the lens and assures highly efficient introduction to a time-of-flight mass spectrometer of high mass resolution, orbitrap mass spectrometer such as Fourier transformed mass spectrometer based on an electric field or Fourier transformed ion cyclotron resonant mass spectrometer. A merit brought about by the linear trap combined with the mass spectrometer of the above type will be described by taking a combination with an orthogonal acceleration/time-of-flight mass spectrometer, for instance. The orthogonal acceleration/time-of-flight mass spectrometer has excellent characteristics including high mass resolution. In this type of mass spectrometer, however, the trade-off relation stands between the sensitivity and the detection range on the high m/z range. In other words, in measuring ions on the high m/z range, the detection efficiency on the low m/z range is degraded. But with the linear trap of the present invention used, a shorter measurement period can be used during measurement of low m/z ions whereas a longer measurement period can be used for measurement of high m/z ions. In this manner, the accelerating period can be changed within a width of approximate 30 to 300 μsec depending on the mass. Thus, in the overall m/z range, ion detection of high efficient and high resolution can be achieved.

Embodiment 2

Figure 6:
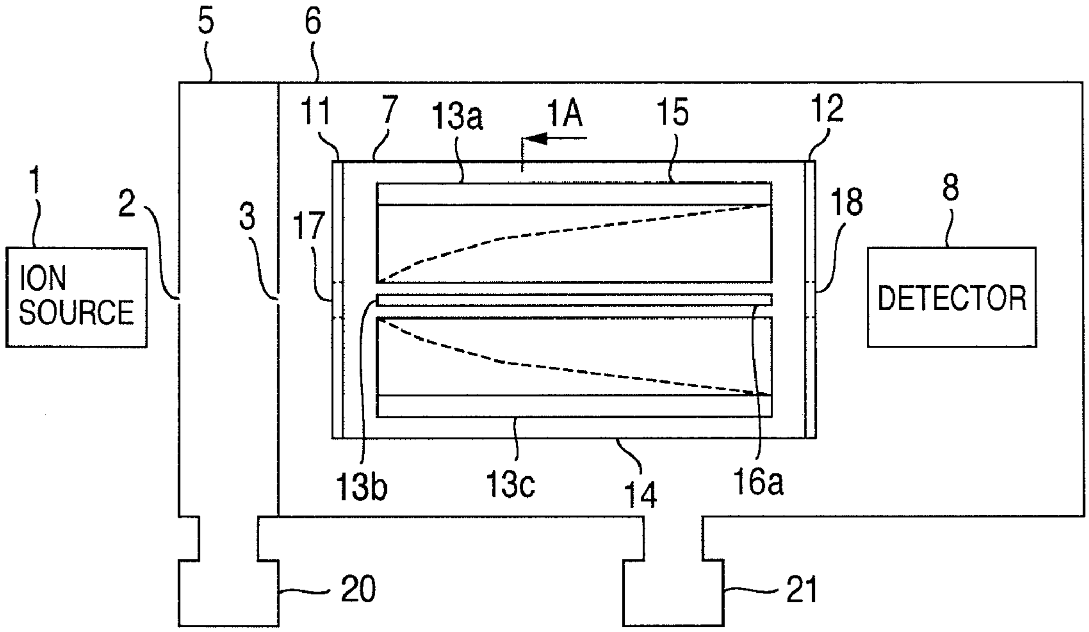
FIG. 6 is a diagram showing embodiment 2 of the system.

Referring to FIG. 6, a mass spectrometer practicing the present linear trap system is constructed as shown therein. Components covering an ion source through a linear trap and components covering the linear trap through a mass selective ejection process are the same as those in embodiment 1 and will not be described herein. In embodiment 2, ions ejected mass selectively from the linear trap are measured directly by means of a detector 8. The detector 8 includes an electron multiplier, for example. As compared to embodiment 1, a simplified and inexpensive construction can be materialized to advantage. On the other hand, the achievable mass resolution is not so high as that in embodiment 1.

Embodiment 3

Figure 7:
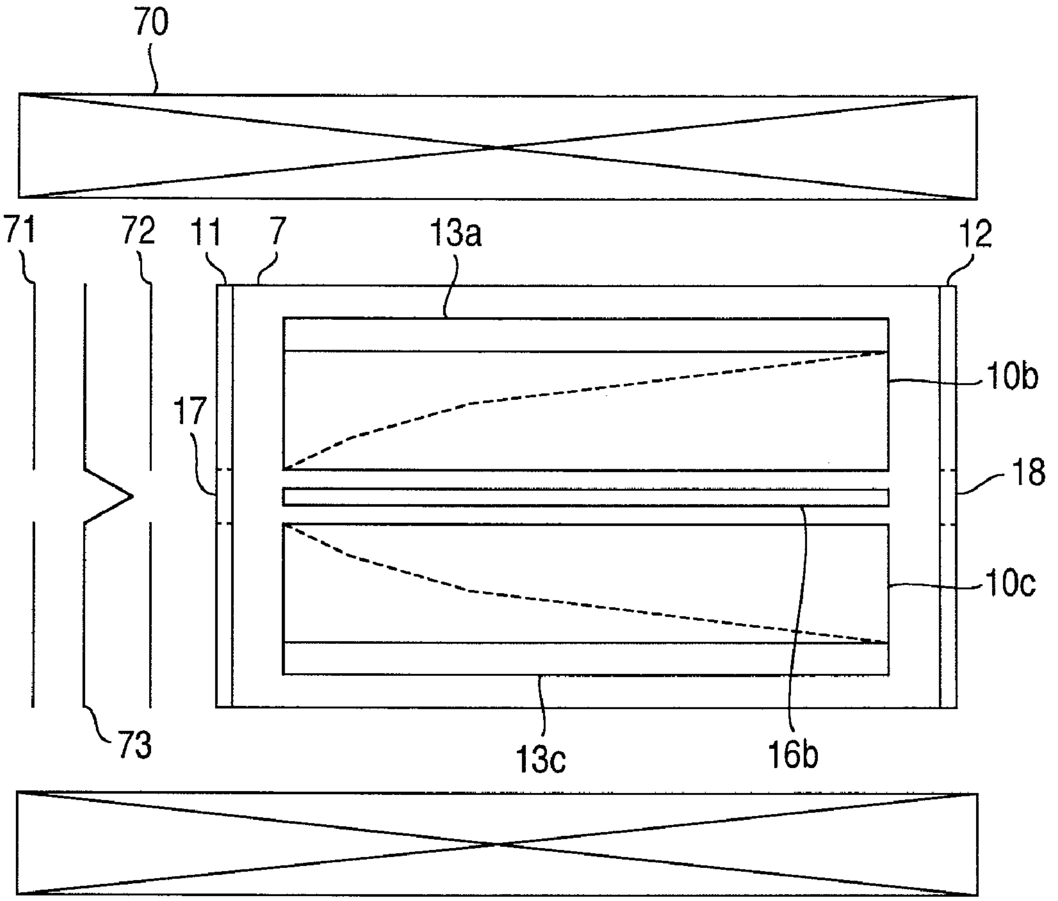
FIG. 7 is a diagram showing embodiment 3 of the system.

Another example of a mass spectrometer practicing the present linear trap will be described with reference to FIG. 7. Components covering an ion source through a linear trap and components covering the linear trap section through a mass selective ejection process are the same as those in embodiment 1 and will not be described herein. In embodiment 3, electrons are introduced to the ion trap by using lenses 71 and 72 and an electron source 73 and therefore, electron capture dissociation and electron detachment dissociation can be assured. For efficient introduction of electrons, a magnetic field of approximate 20 to 200 mT may preferably be formed in the axial direction of the linear trap by means of a magnet 70. The electron source 73 made of a thin tungsten wire of about 0.1 mmϕ can prevent a passage loss of ions. Further, ions can may be introduced from the ion end cap 12. In this case, there needs a deflector lens (not shown) for switching the ion introducer and the ion detector. Further, as mentioned in connection with embodiment 1, ejected ions can be detected highly-efficiently in a time-of-flight mass spectrometer of high mass resolution, orbitrap mass spectrometer such as Fourier transformed mass spectrometer based on an electric field or Fourier transformed ion cyclotron resonant mass spectrometer.

The insection electrode for axial application used in common to embodiments 1 to 3 is not limited to the shape and the number as exemplified herein. In the embodiment, the rod structure is described as being the quadrupole rod structure but a multipole rod structure having a larger number of plural rod electrodes may be used. In any case, in the present invention, voltages applied to these insertion electrode and rods superimpose the DC potential and the RF field axially near the center axis of the quadrupole rods and a pseudo potential formed by the RF field depends on the ion m/z so that this feature may be utilized for ion mass separation.

In the foregoing embodiments, only one of the parameters of RF frequency, RF voltage and DC voltage applied to the insertion electrode structure is changed for mass scan but these parameters may also be changed simultaneously to perform mass scan.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mass spectrometer comprising:

a multipole rod applied with RF voltage for introduction of ions generated in an ion source;

potential formation means for forming a mass dependent potential including a mass dependent pseudo potential and DC potential in the axial direction of said multipole rod;

a detection unit for detecting ions ejected from said multipole rod; and voltage application means for applying voltage to said potential formation means, said voltage application means being operative to apply voltage for causing ions to be ejected mass selectively in the axial direction by changing the minimum point of said mass dependent potential from one side to the other side in the axial direction.

2. A mass spectrometer according to claim 1, wherein said potential formation means includes an insertion electrode inserted in said multipole rod structure and said voltage application means applies electrostatic voltage and RF voltage.

3. A mass spectrometer according to claim 1, wherein said voltage application means changes at least one of electrostatic voltage, RE voltage amplitude and RF voltage frequency to cause ions to be ejected mass dependently in the axial direction.

4. A mass spectrometer according to claim 2, wherein said insertion electrode structure is so shaped as to minimize the intensity of the formed RF field near an outlet end of said multipole rods.

5. A mass spectrometer according to claim 1, wherein said detection unit is a time-of-flight mass spectrometer.

6. A mass spectrometer according to claim 1, wherein said detection unit is a Fourier transformed mass spectrometer utilizing an electric field.

7. A mass spectrometer according to claim 1, wherein said detection unit is a Fourier transformed ion cyclotron resonant mass spectrometer.

8. A mass spectrometer according to claim 1, wherein said detection unit is an electron multiplier.

9. A mass spectrometer according to claim 5, wherein said time-of-flight mass spectrometer changes the repetition rate of accelerating in accordance with masses of ions ejected from a liner trap.

10. A mass spectrometer according to claim 1 further comprising electron irradiation means for irradiating electrons in the axis direction of said multipole rod structure, wherein introduced ions are caused to undergo electron capture dissociation or electron detachment dissociation inside said multipole rod structure.

11. A mass spectrometer according to claim 10 further comprising magnetic field application means for applying a magnetic field in the axial direction of said multipole rod structure.

12. A mass spectrometry method comprising the steps of:

introducing ions to a linear trap constructed of a multipole rod structure;

forming a mass dependent potential including a mass dependent pseudo potential and DC potential in the axial direction of said multipole rod structure;

ejecting trapped ions in the axial direction of said multipole rod structure by changing the minimum point of said mass dependent potential from one side to the other side in the axial direction; and detecting the ejected ions.

13. A mass spectrometry method according to claim 12, wherein electrostatic voltage and RF voltage are applied to an insertion electrode structure inserted in said multipole rod structure to form a mass dependent potential.

14. A mass spectrometry method according to claim 12, wherein at least one of electrostatic voltage, RE voltage amplitude and RF voltage frequency applied to an insertion electrode structure inserted in said multipole rod structure is changed to eject ions.

15. A mass spectrometry method according to claim 12, wherein said mass dependent potential is so formed as to be minimized near an outlet end of said multipole rod structure.

16. A mass spectrometry method according to claim 12, wherein the ejected ions are detected by changing the accelerating period of a time-of-flight mass spectrometer mass dependently.

17. A mass spectrometry method according to claim 12 further comprising the steps of:

applying a magnetic field in the axial direction of said linear trap; and introducing electrons in the axial direction of said multipole rod structure.

* * * * *